United States Patent [19]

Charlton

[11] Patent Number: 5,379,816
[45] Date of Patent: Jan. 10, 1995

[54] AUXILIARY SUPPORT DEVICE FOR A POWER TOOL

[76] Inventor: Russell T. Charlton, 2565 Spahr Rd., Xenia, Ohio 45385

[21] Appl. No.: 155,133
[22] Filed: Nov. 22, 1993
[51] Int. Cl.⁶ .................. B25H 1/02; B27B 25/00
[52] U.S. Cl. .................................. 144/287; 108/69; 83/477.2; 144/286 R
[58] Field of Search .............. 83/574, 471.2, 471.3, 83/477.2; 144/286 R, 286 A, 287; 248/23, 349; 108/65, 69, 73

[56] References Cited

U.S. PATENT DOCUMENTS

| | | | |
|---|---|---|---|
| 746,972 | 12/1903 | Marsh | 144/287 |
| 1,048,596 | 12/1912 | Sedaj | 108/69 |
| 1,086,232 | 2/1914 | Sedaj | 108/69 |
| 4,248,115 | 2/1981 | Brodbeck et al. | 144/287 |
| 4,640,326 | 2/1987 | Hewitt | 83/477.2 |
| 4,852,623 | 8/1989 | Rodrigues | 144/287 |
| 4,934,423 | 6/1990 | Withrow | 144/287 |

*Primary Examiner*—W. Donald Bray
*Attorney, Agent, or Firm*—Joseph G. Nauman

[57] ABSTRACT

An auxiliary support device for table saws, includes an auxiliary table extending rearward and coplanar of the saw main table. An adjustable guide and support member is mounted at one side of the auxiliary table and can be moved toward and away from the one side. Legs maintain the guide and support member parallel to the tops of the tables. The guide and support member includes a slide extensible in a forward direction, parallel to the main table. The auxiliary table and the sideways movable guide and support member provide extended support beyond the main table for large pieces being trimmed to a smaller width. Extending the slide forward provides outboard support over a space beyond the side of the main saw table, opposite from the saw's fence, where the operator can move into this space during completion of a cut, thereby giving him enhanced control over a large panel or piece of stock.

8 Claims, 1 Drawing Sheet

AUXILIARY SUPPORT DEVICE FOR A POWER TOOL

FIELD OF THE INVENTION

This invention relates to an auxiliary support device for power tools, such as table saws, to facilitate the handling of large work pieces, particularly when manipulated by a single operator.

BACKGROUND OF THE INVENTION

Various forms of auxiliary tables and related supports have been proposed for assisting in the manipulation of work pieces in power tools, such as table saws. In cabinet making and similar work, it is often necessary to make cuts in large (e.g. 4 foot×8 foot) sheets of plywood or the like, which may be up to ¾ inch in thickness, and which are relatively cumbersome, heavy, and difficult or awkward to manipulate. On the other hand, it is important to make accurate cuts in the sheets otherwise expensive waste can occur.

U.S. Pat. Nos. 4,106,381; 4,248,115; 4,377,099; and 4,640,346 all disclose forms of auxiliary tables for table saws. U.S. Pat. Nos. 4,161,974 and 4,410,023 disclose auxiliary tables for and overhead saw and a shearing machine, respectively. In addition, several suppliers of table saws provide elementary auxiliary tables as accessories for their equipment.

There is a need for an auxiliary table and support which can be adjusted and which can provide assistance to an operator in instances where cuts are being made relatively close to one edge of a large sheet, and the quite large remaining portion of the sheet will otherwise overhang the edge of the saw table and make the entire process difficult, often requiring two persons to safely handle the sheet being cut. Cabinet makes in particular encounter this situation, and since most such craftsmen are sole proprietors, an assistant is not readily available, or presents additional expense.

SUMMARY OF THE INVENTION

The present invention provides an auxiliary support device for table-type power tools, including an auxiliary table extending rearward of, and coplanar with, the main table of the tool. Fitted to one side of the auxiliary table is an adjustable guide and support member which can be moved toward and away from the one side, and which includes legs to maintain the guide and support member parallel to the tops of the tables. Preferably, the guide and support member includes a slide which is extensible in a forward direction, parallel to the main table. Specifically in a table saw installation, the auxiliary table and the sideways movable guide and support member provide extended support for large pieces being trimmed or cut to a smaller width. By extending the slide forward, outboard support is provided over a space beyond the side of the main saw table (opposite from the saw's fence) and the operator can move into this space during completion of a cut, thereby giving him enhanced control over the large panel or piece of stock.

The principal object of the invention is, therefore, to provide an auxiliary table and work support for table-type power tools, particularly table saws, in which an auxiliary table is fitted to extend from the rear of the main table of the power tool, and a guide and support member is fitted to the auxiliary table and is movable laterally thereof to provide extended support lateral of the power tool; and to provide such an auxiliary table and support wherein the guide and support member includes a forward movable slide.

Other objects and advantages of the invention will be apparent from the following description, the accompanying drawings and the appended claims.

DESCRIPTION OF PREFERRED EMBODIMENT

Figure 1:
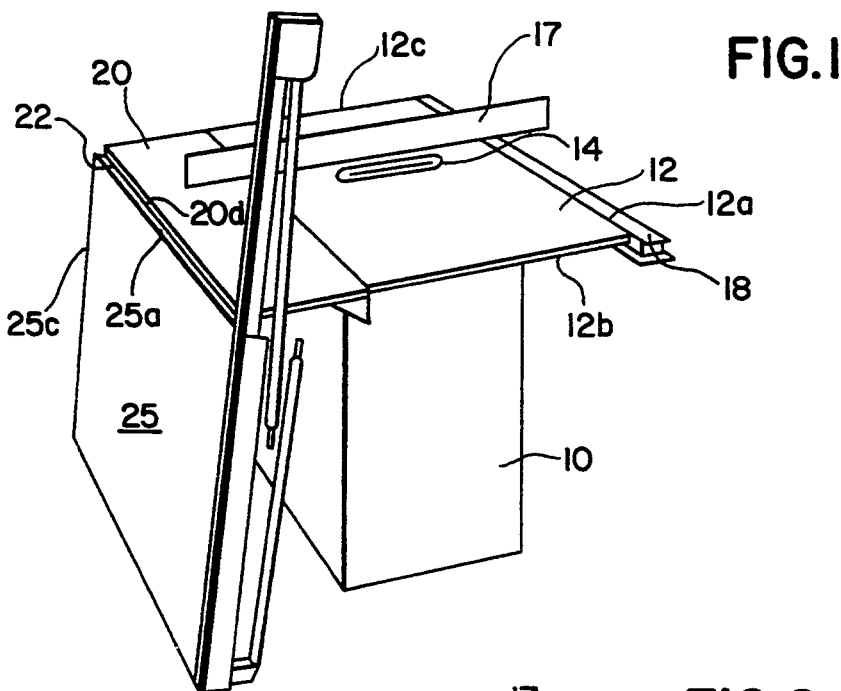
FIG. 1 is a perspective view of a typical table saw, with the auxiliary table and support of the invention attached to the rear of the saw table and folded to a retracted position.
Figure 2:
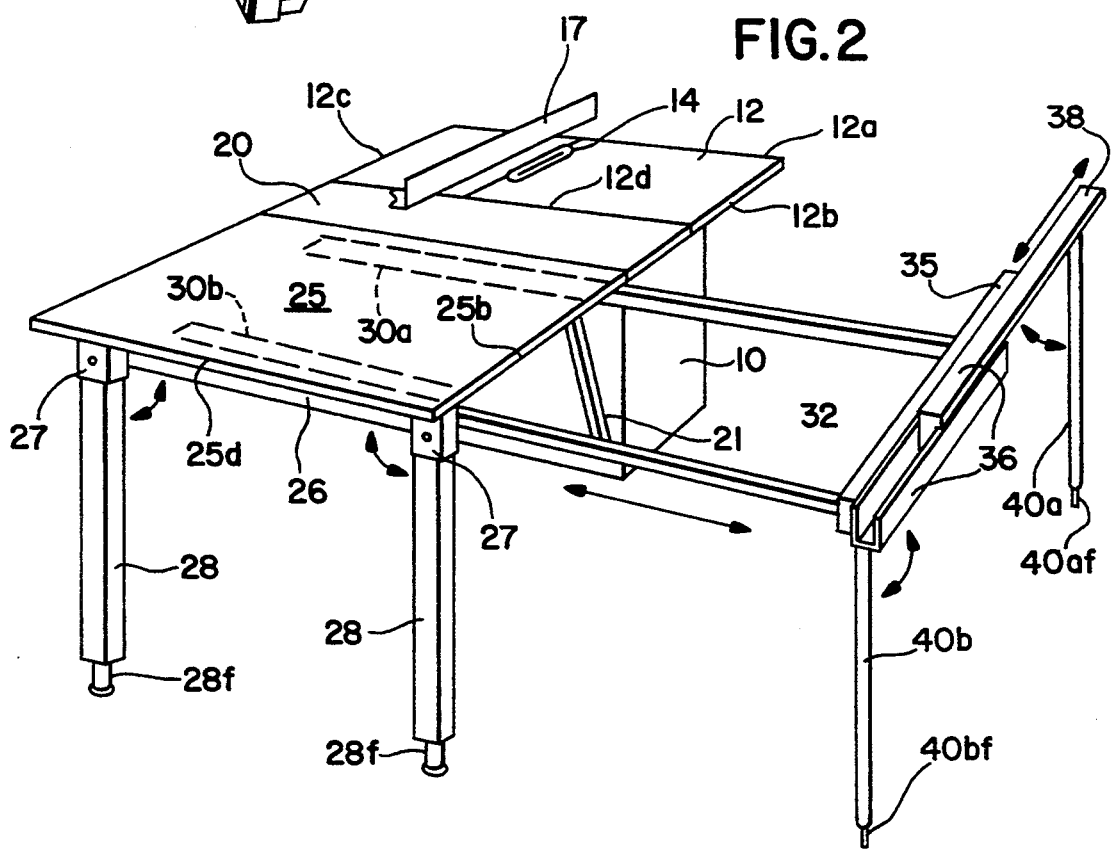
FIG. 2 is a perspective view showing the auxiliary table in erected position, and the laterally extensible guide and support shown in its fully erected and extended position.

Referring to FIG. 1, a typical tilt-arbor circular saw is illustrated as including a base 10 which supports a work table 12 having a slotted plate 14 through which can protrude a circular saw blade (not shown) in conventional fashion. The blade can be raised and lowered through the plate to control the depth of cut, in known manner. Work table 12 has a front edge 12A, sides 12B and 12C, and a rear edge 12D. Mechanism for supporting, raising/lowering, tilting, and driving the saw blade is housed within base 10, and is not further described since it is conventional and does not pertain to the invention.

A conventional work piece guide or fence 17 extends front to rear of table 12, parallel to the blade (not shown), and is supported on front rail or beam 18, perpendicular to that rail, for adjustment sideways of table 12. As is known, the fence defines the width of a portion to be cut from a work piece as the piece is moved rearward over table 12 past the saw blade, and to guide the motion of the work piece for an accurate cut.

Attached to table 12, along rear edge D, is a secondary auxiliary table 20, which is an optional feature of the invention, preferred (but not necessary) for attachment and support of the main auxiliary table 25 and related push-off guides. The secondary table 20 allows easier installation and support of the entire auxiliary equipment provided by the invention- Generally, during such installation, secondary table 20 is attached, flush and co-planar, to saw table 12 and normally will remain in position, not movable, and one or more fixed legs 21 extend upward and rearward at an angle from base 10 providing support and stabilization for table 20 and the parts supported by it.

Hinged to the rear edge 20D of secondary table 20, as by a piano hinge 22, or other suitable hinge device which assures stable and accurate attachment and alignment, is the main auxiliary table 25, having a front edge 25A at hinge 22, sides 25B and 25C, and a rear edge 25D. The front to rear dimension of table 25 is slightly less than the height of saw table 12, to allow table 25 to be folded downward along hinge 22 into a stowed generally vertical position beneath the rear edge 20D of table 20, as shown in FIG. 1. If secondary table 20 is not employed, hinge 22 may be attached directly to the rear edge 12D of saw work table 12, however provisions must be made to assure that the hinge provides accurate support of table 25 coplanar with table 12.

Beneath the rear edge 25D is one of a pair of tubular member 26A and 26B, having depending channel members 27 which receive the upper ends of rear legs 28. The rails, sockets and legs can conveniently be formed of square tubing, with the ends of legs 28 being hinged on bolts through channel members 27 and locked in place by suitable spring-loaded detents (not shown). This allows legs 28 to be folded when the table 25 is moved to its stowed position. Adjustable feet 28F are fitted into the lower ends of legs 28, for leveling adjustment when the table 25 is deployed.

Beneath main auxiliary table 25, the spaced apart channels or tubular members 26A (forward) and 26B (rearward), which may for example be sections of square tubing fixed to the bottom of table 25, extending parallel to its front and rear edges 25A, 25D and perpendicular to the saw blade. Fitted into channels 26 are rods or tubes 32, which are slidable in telescopic fashion into and out of channels 26. Suitable stops (not shown) lock rods 32 in a desired position within channels 26A and 26B. Thus, in operative position, table 25 is moved upward coplanar to saw table 12 and secondary table 20, and legs 28 are deployed for support of table 25.

Fixed perpendicularly to the ends of rods 32 is an elongated guide 36. Support member 35 is attached to the inward facing edge of extension member 36. A slide 38 is fitted into extension 36 to be movable in a forward direction parallel to table side 25B. Outboard support legs 40A and 40B are hinged, respectively, to slide extension 36 and slide 38 (as shown) and each of these legs includes an adjustable foot 40AF and 40BF. In the stowed position (FIG. 1) legs 40A and 40B are folded inward of the slide and extension. When table 25 is deployed, members 35, 36 and 38 are pulled outward from table side 25B to a desired spacing from the main auxiliary table 25, and slide 38 is moved forward, parallel to and spaced from the saw table side B.

This arrangement provides two features. First, main auxiliary table 25 provides extended support and stabilization when cutting large work pieces, such as paneling, large sheets of plywood, etc. Depending upon the width of such large pieces, and the width of cut being made in them, guide and support member 35 and its extension 36 also provide outboard support. Second, the extended support member 35, particularly with extension slide 38 deployed forward toward front edge A of saw table 12, defines an open space S into which an operator can move, without unduly stretching or leaning over the table 12 and possibly impairing his balance, to give the operator better control over the larger work pieces, especially during the end of a long cut through them.

While the form of apparatus herein described constitutes a preferred embodiments of this invention, it is to be understood that the invention is not limited to this precise forms of apparatus, and that changes may be made therein without departing from the scope of the invention which is defined in the appended claims.

What is claimed is:

1. An auxiliary support device for use with a power tool having a main work table with an upper support surface and front, rear and side edges, and a cutting tool associated with the main table surface to cut work pieces moved over the surface of the main work table, said auxiliary support device comprising
   an auxiliary table having an upper support surface and attached to said main work table adjacent said rear edge,
   legs on said auxiliary table for supporting said auxiliary table coplanar with the main work table support surface,
   a guide and support member located on and attached to one side of said auxiliary table, and
   means mounting said guide and support member for movement toward and away from said one side of said auxiliary table to provide an outboard support for work pieces moved over the main and auxiliary work tables from the front edge to the rear edge,
   said guide and support member including a sliding extension movable forward into predetermined spaced relation to said one side edge of the maid work table.

2. A device as defined in claim 1, wherein said auxiliary table has a hinged connection to the main work table providing for movement of said auxiliary table between a generally vertically disposed stowed position at the rear of the main work table, and an operative horizontal position extending rearward of and coplanar with the main work table.

3. In a table-type power saw having a main work table with an upper support surface and front, rear and side edges, and a saw blade movable through said main table surface to cut work pieces moved over the surface of said main work table past said saw blade,
   an auxiliary support device for assisting in control of large pieces to be manipulated over said main table, said auxiliary support device comprising
   an auxiliary table having an upper support surface and attached to said main work table on said rear edge,
   legs on said auxiliary table for supporting said auxiliary table coplanar with said main work table support surface,
   a guide and support member located on one of said side edges of said auxiliary table, and
   means mounting said guide and support member for movement toward and away from said one side edge of said auxiliary table to provide an outboard support for work pieces moved over said main and auxiliary work tables.

4. A power saw as defined in claim 3, including a fence mounted on said main table extending parallel to said saw blade for guiding a work piece past said saw blade,
   said guide and support member being located on the opposite side of said saw blade from said fence to provide lateral support for large work pieces extending beyond the side edge of said main work table.

5. In a table-type power saw having a base and a main work table mounted on said base, said work table having an upper support surface and front, rear and side edges, and a rotary saw blade mounted in said base and movable through said main table surface to cut work pieces moved over the surface of said main work table past said saw blade,
   an auxiliary support device for assisting in control of large pieces to be manipulated over said main table, said auxiliary support device comprising
   an auxiliary table having opposite side edges and an upper support surface, and said auxiliary table being supported with respect to said main work table along said rear edge thereof,
   legs on said auxiliary table for supporting said auxiliary table coplanar with said main work table support surface,
   a guide and support member located on said auxiliary table for movement toward and away from one side edge of said auxiliary table, means mounting said guide and support member for movement toward and away from said one side edge of said auxiliary table to provide an outboard support for work pieces moved over said main and auxiliary work tables, and legs on said guide and support member for maintaining said guide and support member coplanar with said main and auxiliary table surfaces.

6. A device as defined in claim 5, wherein said guide and support member includes a sliding extension movable forward into predetermined spaced relation to said one side edge of the main work table to define a space laterally of said base over which large work pieces are supported between said main work table and said sliding extension.

7. A device as defined in claim 6, wherein said auxiliary table has a hinged connection to said main work table providing for movement of said auxiliary table between a generally vertically disposed stowed position at the rear of said main work table and said base, and an operative horizontal position extending rearward of and coplanar with the main work table, and said legs on said guide and support member being fordable upward when said auxiliary table is moved to the stowed position.

8. An outboard work support device for use with a power tool having a main work table with an upper support surface and front, rear and side edges, a saw blade associated with the main table surface to cut work pieces moved over the surface of the main work table, a fence mounted on the main table extending parallel to the saw blade for guiding a work piece past the saw blade, and an auxiliary table having an upper support surface coplanar with the main work table and extending from the rear edge thereof;

said device comprising a guide and support member located on and attached to one side of the auxiliary table, means mounting said guide and support member for movement toward and away from the one side of the auxiliary table, said guide and support member being located on the opposite side of the saw blade from the fence to provide lateral support for large work pieces extending beyond the side edge of the main work table, and said guide and support member including a sliding extension movable forward into predetermined spaced relation to the one side edge of the main work table to define a space laterally of the said main work table over which large work pieces are supported between the main work table and said sliding extension.

* * * * *